(12) United States Patent
Fallon

(10) Patent No.: US 7,833,417 B2
(45) Date of Patent: Nov. 16, 2010

(54) METHOD FOR IMPROVING HYDROCARBON-WATER COMPATIBILITY IN A SUBSURFACE HYDROCARBON-CONTAMINATED SITE

(75) Inventor: Robert D. Fallon, Elkton, MD (US)

(73) Assignee: E. I. duPont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/194,803

(22) Filed: Aug. 20, 2008

(65) Prior Publication Data
US 2009/0050317 A1 Feb. 26, 2009

Related U.S. Application Data

(60) Provisional application No. 60/957,805, filed on Aug. 24, 2007.

(51) Int. Cl.
C02F 3/00 (2006.01)
(52) U.S. Cl. .................................... 210/610; 210/747
(58) Field of Classification Search ................. 210/610, 210/747
See application file for complete search history.

(56) References Cited

U.S. PATENT DOCUMENTS

| | | | |
|---|---|---|---|
| 3,199,591 A | 8/1965 | Kepley | |
| 4,522,261 A | 6/1985 | McInerney et al. | |
| 5,389,267 A * | 2/1995 | Gorelick et al. | 210/758 |
| 5,458,747 A | 10/1995 | Marks et al. | |
| 7,472,747 B1 * | 1/2009 | Brigmon et al. | 166/246 |
| 2002/0090697 A1 | 7/2002 | Hince | |
| 2002/0187545 A1 | 12/2002 | Calcavecchio et al. | |
| 2004/0043474 A1 | 3/2004 | Newman | |
| 2004/0157317 A1 | 8/2004 | Sorenson et al. | |

FOREIGN PATENT DOCUMENTS

| | | |
|---|---|---|
| WO | 2006018305 | 2/2006 |
| WO | 2006061556 | 6/2006 |

OTHER PUBLICATIONS

West et al., Surfactants and Subsurface Remediation, Environ. Sci. Techncl., 1992, vol. 26:2324-2330.
T. R. Neu, Significance of Bacteriol Surface-Active Compounds in Interaction of Bacteria With Interfaces, Microbiological Reviews, 1996, vol. 60:151-166.
R. M. Mercade et al., Effect of the Carbon Source on Biosurfactant Production by *Pseudomonas aeruginosa* 44T1, Biotechnology Letters, 1989, vol. 11:871-874.
L. H. Guera-Santos et al., Dependence of *Pseudomonas aeruginosa* Continuous Culture Biosurfactant Production on Nutritional and Environmental Factors, Applied Microbiology and Biotechnology, 1986, vol. 24:443-448.

(Continued)

*Primary Examiner*—Chester T Barry

(57) ABSTRACT

The present invention relates to methods for improving hydrocarbon-water compatibility. More specifically, the invention relates to methods for enhancing the production of surface-active agents in hydrocarbon-exposed surface waters in order to improve hydrocarbon-water compatibility. Hydrocarbon-exposed surface waters having enhanced levels of surface-active agents can be used to improve remediation of subsurface hydrocarbon-contaminated sites.

16 Claims, 2 Drawing Sheets

OTHER PUBLICATIONS

F. Widdel et al., Studies on Dissimilatory Sulfate-Reducing Bacteria That Decompose Fatty Acids, Arch. Microbiol., 1983, vol. 134:286-294.

Banat, Bioresource Technology 51 (1995) pp. 1-12.

Youssef et al., Applied and Environmental Microbiology, Feb. 2007, vol. 73, No. 4, pp. 1239-1247.

H. Neumaier, H. H. Weber: "Altlasten, Erkennen, Bewerten, Sanieren" 1996, Springer, 3 Ed., Berlin, XP002528192, ISBN: 3-540-59316-0.

International Search Report and Written Opinion in related PCT/US2008/073961 mailed Jun. 12, 2009.

* cited by examiner

METHOD FOR IMPROVING HYDROCARBON-WATER COMPATIBILITY IN A SUBSURFACE HYDROCARBON-CONTAMINATED SITE

FIELD OF THE INVENTION

The present invention relates to methods for improving hydrocarbon-water compatibility. More specifically, the invention relates to methods for enhancing microbial growth and emulsifying activity in order to improve hydrocarbon-water compatibility in a subsurface hydrocarbon-contaminated site.

BACKGROUND OF THE INVENTION

Water and hydrocarbons such as oil and gasoline are incompatible phases, thus a number of techniques, such as the use of surface-active agents, have been studied in an effort to decrease the repellency between water and said hydrocarbons. Surface-active agents are expected to be useful for the remediation of shallow, subsurface sites that have been contaminated with hydrocarbons. The introduction of surface-active agents can be used to solubilize or mobilize hydrocarbons adsorbed to soil particles or present as a separate hydrocarbon phase (see, for example, West, C C and Harwell, J H, "Surfactants and Subsurface Remediation" Environ. Sci. Techncl., 1992, 26(12):2324).

Some microbial products can decrease oil-water repellency because they are surface active. Only certain groups of microorganisms are able to produce these surface-active compounds (Neu, T. R (Microbiological Reviews, 1996, 60:151-166). Such biologically produced surface-active compounds have also been suggested for use in remediation of hydrocarbon-contaminated sites. Many biologically produced surface-active compounds are based on production by pure cultures of aerobic microorganisms (for example, U.S. Pat. No. 4,522,261).

There exists a need for an inexpensive and effective method for producing surface-active agents that can be used for improving hydrocarbon-water compatibility, and thus for improving remediation of hydrocarbon-contaminated subsurface sites.

SUMMARY OF THE INVENTION

The present invention provides a method for improving hydrocarbon-water compatibility in a subsurface hydrocarbon-contaminated site:

(a) obtaining a sample of hydrocarbon-exposed surface water;
(b) optionally supplementing the surface water of (a) with at least one member selected from the group consisting of (1) at least one carbon/energy source, (2) at least one nitrogen source, and (3) a combination of (1) and (2), such that the final molar ratio of carbon to nitrogen in the surface water of (a) is at least about 6 to 1, thereby producing a supplemented surface water;
(c) incubating the hydrocarbon-exposed surface water of (a) or the supplemented surface water of (b) under aerobic or anoxic conditions to produce conditioned water having a desired level of surface-active agents; and
(d) injecting the conditioned water of (c) into said subsurface hydrocarbon-contaminated site such that the conditioned water comes in contact with hydrocarbons present at the site, thereby improving said hydrocarbon-water compatibility.

In additional embodiments, the carbon to nitrogen ratio is at least about 12 to 1 and 25 to 1. Improved hydrocarbon-water compatibility is useful for improving hydrocarbon-contaminant removal from subsurface hydrocarbon-contaminated sites.

DETAILED DESCRIPTION OF THE INVENTION

Figure 1:
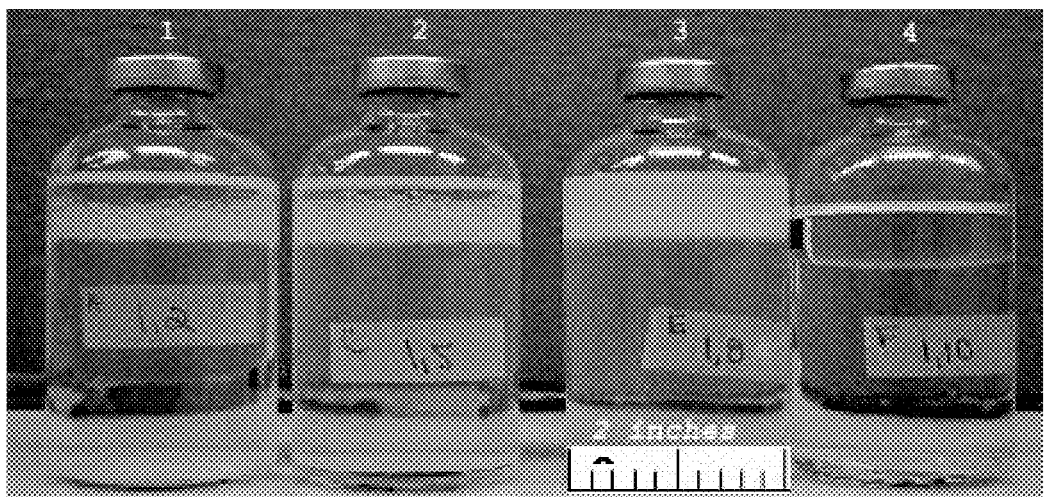
FIG. 1 shows the treatment vials which were set up as described in Example 1 and Table 3 after 8 days of growth.

Waters exposed to hydrocarbons are common to oil reservoirs and hydrocarbon-contaminated subsurface environments. Under appropriate conditions, microorganisms in these waters are capable of producing surface-active agents. The present invention utilizes exogenous, mixed microbial populations present in surface waters that have been exposed to hydrocarbons as a means of inexpensively generating surface-active agents for improving hydrocarbon-water compatibility. According to embodiments of the present invention, surface waters comprising said surface-active agents can then be used to improve hydrocarbon contaminant removal from hydrocarbon-contaminated subsurface sites.

The following definitional structure is provided for certain terminology as employed in this specification:

"Remediation" is a process used to remove contaminants from a contaminant-altered environment.

"Injection water" is water pumped down into a subsurface site for pressure maintenance.

"Production water" is water associated with oil recovered from the production well.

A "surface-active agent" is a material that can reduce the surface tension of water in contact with a non-aqueous surface.

A "carbon/energy source" is an organic compound that provides both a carbon source and an energy source for microbial cell growth.

An "injector well" is a well used in subsurface remediation to add agents that will aid decontamination of groundwater and subsurface formations.

An "interceptor well" is a well used to control local groundwater flow gradients at remediation sites in order to minimize the movement of contaminated material off site, usually by withdrawing liquid from the subsurface formation.

"Conditioned water" is hydrocarbon-exposed water comprising a desired level of surface-active agents.

"Emulsion stability time" is the time (in seconds, minutes, or hours) that is required for oil-water emulsion droplets to completely disappear to the unaided eye following a prescribed, vigorous shaking of a two phase oil-water mixture.

"Hydrocarbon-water compatibility" refers to the degree to which the surface tension of a hydrocarbon is reduced at the water-hydrocarbon interface where lower surface tension equates with improved hydrocarbon-water compatibility.

"Hydrocarbon-exposed surface water" refers to water at the land surface that is in contact or has been in contact with a hydrocarbon-containing site as defined herein.

"Hydrocarbon" refers to a molecule formed primarily by carbon and hydrogen atoms. Examples include crude oil (crude petroleum) and gasoline.

"Oil" refers to refined or crude petroleum.

In one embodiment, the present invention relates to a method for improving hydrocarbon-water compatibility in a subsurface hydrocarbon-contaminated site:

(a) obtaining a sample of hydrocarbon-exposed surface water;

(b) optionally supplementing the surface water of (a) with at least one member selected from the group consisting of (1) at least one carbon/energy source, (2) at least one nitrogen source, and (3) a combination of (1) and (2), such that the final molar ratio of carbon to nitrogen in the surface water of (a) is at least about 6 to 1, thereby producing a supplemented surface water;

(c) incubating the hydrocarbon-exposed surface water of (a) or the supplemented surface water of (b) under aerobic or anoxic conditions to produce conditioned water having a desired level of surface-active agents; and (d) injecting the conditioned water of (c) into said subsurface hydrocarbon-contaminated site such that the conditioned water comes in contact with hydrocarbons present at the site, thereby improving said hydrocarbon-water compatibility.

According to the present invention, a hydrocarbon-containing site is a subsurface or subterranean site that harbors hydrocarbons. In one embodiment, the hydrocarbon-containing site is a hydrocarbon-contaminated site, where it is desired that remediation be used to remove the hydrocarbon contaminants from said site. An example of a hydrocarbon-contaminated site is the area surrounding a leaking underground gasoline storage tank.

Hydrocarbon-exposed surface waters can in principle be any water that has been exposed to hydrocarbons, preferably hydrocarbons having a composition that approximates the composition of the hydrocarbon-containing site. Examples of hydrocarbon-exposed surface waters include oil-well associated surface waters, such as production water or injection water. Examples also include groundwater remediation-site injector well water, groundwater remediation site interceptor well water, as well as wastewaters, surface waters from hydrocarbon-contaminated sites, or run-off waters. The hydrocarbon-exposed surface water need not be derived from the hydrocarbon-containing site into which the conditioned water will be injected, however economically this may be the preferred source.

In one embodiment, water from the hydrocarbon-containing site is collected in a holding tank. The holding tank can be any suitable vessel capable of holding the quantity of surface water to be conditioned under the parameters required for conditioning, such as aeration. The water should not have undergone any treatments that would kill or prevent the growth of microbial populations, for example biocide treatment or heating above 50° C.

According to the present invention, the growth and production of surface-active agents by exogenous microorganisms can be stimulated in hydrocarbon-exposed surface waters through the addition of appropriate nutrients. Reports describing pure culture studies have shown that biosurfactant production is dependent on the composition of the medium in which the microorganism(s) grow (see, for example, Mercade, R. M. et al 1989. Biotechnology letters 11: 871 and Guera-Santos, L. H. et al, Applied microbiology and biotechnology 24: 443). We have determined that medium composition is similarly important for surface-active agent production by mixed populations of exogenous microorganisms in waters from hydrocarbon-exposed sites. Excess of carbon/energy source promotes the production of surface-active agents.

In one embodiment, the at least one carbon/energy source that results in production of surface-active agents by the microorganisms is added to the water collected in the holding tank. The carbon/energy supplement is added at greater than or equal to approximately 10 g per liter. In one embodiment the carbon/energy supplement is added at approximately 30 g to 60 g per liter. The appropriate at least one carbon/energy source can be determined empirically by testing for decreased surface tension following microbial growth as is known to those skilled in the art, or can be determined by economic factors related to cost and availability of carbon/energy sources. Examples of suitable carbon/energy sources include soluble starch, potato starch, cornstarch or other vegetable starches, propionate, acetate, vinegar, lactate, whey solids, lactic acid, butyrate, butyric acid, glucose, high fructose corn syrup, soybean oil, corn oil or olive oil. Propionate, acetate, lactate and butyrate can be supplied as any suitable soluble salt, such as sodium. Vinegar (acetic acid), lactic acid and butyric acid can be neutralized to a pH suitable for microbial growth and/or production of surface-active agents. In one embodiment, vinegar, lactic acid and butyric acid are neutralized to a pH of about 4 to about 9; in another embodiment, these acids are neutralized to a pH of about 6 to about 8. These carbon/energy sources may be added to the holding tank individually or in combination as long as the weight specification is met. The pH of surface water is typically about 4 to about 9.

In one embodiment favoring anaerobic populations, a nitrate or nitrite salt is added to the holding tank and the water is maintained under anoxic conditions, wherein any headspace gas is a gas other than air or oxygen. Sodium, potassium, calcium, magnesium, or other soluble salts of nitrate or nitrite may be used individually or in combination. Nitrate is added in an amount sufficient to induce surface-active agent production. In one embodiment, nitrate or nitrite is added at a molar C/N ratio of about 6/1, wherein C is carbon from the carbon/energy source and N is nitrate or nitrite nitrogen. In another embodiment, the C/N ratio is about 12/1, and in yet another embodiment, the C/N ratio is about 25/1. microorganism water in the holding tank can be mixed, for example by recirculating the water at 1 tank volume/day.

In another embodiment favoring aerobic populations, a nitrate or nitrite salt is added where the total addition of nitrate and/or nitrite is equivalent to approximately 0.4 g per liter as nitrogen. As described above, the molar C/N ratio is at least about 6/1. In another embodiment, the C/N ratio is about 12/1, and in yet another embodiment, the C/N ratio is about 25/1. Sodium, potassium, calcium, magnesium, or other soluble salts of nitrate or nitrite may be used individually or in combination. In addition, a jet diffuser or similar device can be used to provide air to the liquid in the holding tank, for example at a rate of 1-3 $m^3$ air/$m^3$ liquid per day.

In one embodiment, the hydrocarbon-exposed surface water does not require supplementation with either a carbon/energy source or a nitrogen source. For example, the water can be determined to contain the correct C/N ratio, and thus can be incubated as necessary to induce the formation of surface-active agents without additional supplementation. Alternatively, the water can contain the desired level of surface-active agents and can be used directly as conditioned water. The amount of surface-active agent present in the surface water can be determined or approximated by any suitable means, such as by using the emulsion stability time test as described below.

Additional conditions, well known to those skilled in the art of microbiology, must be met in order to obtain successful microbial growth and production of surface-active agents in the holding tank. For example, the pH of the water in the holding tank should be maintained at a pH suitable for surface-active agent production, typically between approximately pH 4 and pH 9. The temperature of the water in the holding tank will typically be maintained between about 20° C. and 50° C. Typically the surface water is incubated for at least about 2 days to allow microbial growth and surface active agent production.

From embodiments above, one skilled in the art will recognize that to achieve the desired level of surface-active agents in the hydrocarbon-exposed surface water, it is necessary to determine and/or monitor a number of parameters. The length of incubation time in the holding tank during which the microorganisms grow and produce surface-active agent will be in part dependent on the number of surface-active agent producing microorganisms originally present in the water. Lower initial numbers of microorganisms are expected in production well, injection well, injector well, or interceptor well water. Higher initial numbers, and possibly also higher nutrient levels, are expected in wastewaters and runoff waters. By selection of the appropriate hydrocarbon-exposed surface water having an exogenous mixed microbial population, supplementing said water if necessary, and optimizing incubation if necessary relative to temperature, pH, aeration and mixing, the desired level of surface-active agents will be achieved.

To monitor the production of surface-active agents, samples can be withdrawn from the holding tank daily and tested for the presence of surface-active agents by any means known to those skilled in the art. In one embodiment, the relative level of surface-active agents is determined using tensiometry, and in another embodiment the emulsion stability time test can be used. In one embodiment, the emulsion stability time test is carried out by adding a light hydrocarbon such as 2,2,4,4,6,8,8-heptamethylnonane, hexadecane or five-weight motor oil, 2 mL, to 8 mL of holding tank water. The two-phase mixture is shaken vigorously in a prescribed manner for a time sufficient to mix the two phases, such as 30 seconds, and then put aside. The time required for the emulsion to separate is recorded.

When the surface-active agent reaches a desired level, the water is considered conditioned and can be injected into the hydrocarbon-containing site. In one embodiment, the desired level of surface-active agent is the maximal level achievable. The maximal level can be estimated using the emulsion stability time test, wherein when the time for the emulsion to separate reaches a maximum, the level of surface-active agents produced in the surface water is expected to be at a maximum.

For injection at a subsurface hydrocarbon-contaminated site, the process of the invention can be carried out according to the following embodiment. Conditioned water can be produced according to embodiments of the present invention at the site of a clean-up of subsurface contamination via remediation. When emulsion stability time is at a maximum, the conditioned water is ready for injection through the injector well. After connecting the holding tank with conditioned water to the injector well water flow, the mixture is pumped into the subsurface site. The rate of addition of the conditioned surface water is maintained such that the increase in the injector well backpressure is less than or equal to about 20% of the initial backpressure. As this limit is approached, metering of the conditioned surface water into the injector well is stopped. Injection water flow is allowed to continue. Once backpressure drops to below 10% above the initial backpressure, metering of the conditioned water into the injector well is restarted. In this manner, the conditioned water is pumped into the site via the injector well without causing loss of injectivity at the hydrocarbon-contaminated site face. Remediation of the contaminant is accelerated as a result of pumping the conditioned water through the contaminated formation.

EXAMPLES

The present invention is further defined in the following Examples. It should be understood that these Examples, while indicating preferred embodiment of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

In the following examples, "° C." is degrees Centigrade, "mg" is milligram; "kg" is kilogram; "g" is gram; "µg" is microgram; "mL" is milliliter; "L" is liter; "mMolar" is millimolar; "µM" is micromolar; "mm" is millimeter; "rpm" is revolutions per minute; and "h" is hour.

General Methods

Water samples were obtained from oil well sites of the North Slope of Alaska. They were held at approximately 0° C. on wet ice and returned to the laboratory within one week. In the laboratory water samples used for experiments were held at 4° C. under anoxic conditions. These water samples were used to inoculate experimental test systems in the laboratory. Incubations were done at room temperature under anaerobic, denitrifying conditions with shaking at approximately 125 rpm. All test systems were two-phase with an upper hydrocarbon phase and a lower aqueous medium phase. The upper hydrocarbon phase contained either crude oil from the North Slope of Alaska or 2,2,4,4,6,8,8-heptamethylnonane (HMN). HMN is a non-metabolizable hydrocarbon used as a surrogate for crude oil. As a transparent hydrocarbon, rather than darkly colored, like crude oil, it allows better visualization of the emulsion with water. North Slope water samples containing mixed microbial populations were inoculated into mineral medium 1 (Table 1) at a volume ratio of approximately one part water sample to nine parts mineral medium. Incubations lasted approximately 8 to 21 days. The production of surface-active agents by the microorganisms was monitored in one of two ways. In one method, the emulsion formed as a result of the constant shaking was measured in vials set aside without movement. The vial was oriented upright in the dark and the decrease in the height of the emulsion and any changes in appearance were monitored over 48 hours. In another method, the two phases in the vial were first allowed to separate after removal of the vial from the shaking incubator. The vial was then shaken in a prescribed manner, which can be described as 20 up-and-down motions of 6 inches length done in 20 seconds with the vial inverted. The vial was then set upright and left motionless. The decrease in the height of the emulsion was monitored over time. The time at which no separated emulsion particle remained was recorded as the emulsion stability time.

Nitrate and nitrite analysis was performed using ion exchange chromatography (IC) on an ICS2000 chromatography unit (Dionex, Banockburn, Ill.). Ion exchange chromatography was performed on an AS15 anion exchange column using a gradient of potassium hydroxide.

TABLE 1

Mineral medium #1

| Chemical | Final Concentration | Units |
|---|---|---|
| $NH_4Cl$ | 18.7 | mMolar |
| $KH_2PO_4$ | 3.7 | mMolar |
| $MgCl_2 \cdot 6H_2O$ | 984 | µMolar |
| $CaCl_2 \cdot 2H_2O$ | 680 | µMolar |
| NaCl | 172 | mMolar |
| $NaHCO_3$ | 23.8 | mMolar |
| Vitamin B12 | 100 | µg/L |
| p-Aminobenzoic acid | 80 | µg/L |
| D(+)-Biotin | 20 | µg/L |
| Nicotinic acid | 20 | µg/L |
| Calcium pantothenate | 100 | µg/L |
| Pyridoxine hydrochloride | 300 | µg/L |
| Thiamine-HCl x 2 $H_2O$ | 200 | µg/L |
| Alpha-lipoic acid | 50 | µg/L |
| SL-10 trace metals solution (see Table 2) | 1 | mL/L |
| Sodium nitrate | 1 | g/L |
| $KSO_4$ | 100 | mg/L |

TABLE 2

SL-10 Trace mineral solution[a]

| Component | Amount | Unit |
|---|---|---|
| HCl (25%; 7.7 M) | 10.00 | ml |
| $FeCl_2$ x 4 $H_2O$ | 1.50 | g |
| $ZnCl_2$ | 70.00 | mg |
| $MnCl_2$ x 4 $H_2O$ | 100.00 | mg |
| $H_3BO_3$ | 6.00 | mg |
| $CoCl_2$ x 6 $H_2O$ | 190.00 | mg |
| $CuCl_2$ x 2 $H_2O$ | 2.00 | mg |
| $NiCl_2$ x 6 $H_2O$ | 24.00 | mg |
| $Na_2MoO_4$ x 2 $H_2O$ | 36.00 | mg |
| Distilled water | 990.00 | ml |

[a]First dissolve $FeCl_2$ in the HCl, then dilute in water, add and dissolve the other salts (from Widdel, F., et al, Arch. Microbiol. (1983) 134: 286-294)

Example #1

The Effect of Various Supplements on the Production of Surface-active Agents

Microbial inocula from production water from a North Slope oil well were added to mineral medium #1. The effect of various supplements on the production of surface-active agents was determined. A surrogate oil phase consisting of 1.4% decane, 1% naphthalene, 1% decalin and 96.6% HMN was used in this experiment. Microbial growth occurred under anaerobic, denitrifying conditions at room temperature with shaking at 125 rpm. Analysis of nitrate and nitrite concentrations showed that microbial denitrification was most rapid in treatments receiving acetate. After eight days of growth, emulsification was apparent in a number of the treatments. After allowing the oil-aqueous mixtures to stand for 42 h, a significant emulsion layer remained, except in the control treatment lacking both added supplement and microbial inoculum. This shows that emulsions formed by microbial activity were quite stable. Results in Table 3 show that when supplemented with acetate, the microorganisms in production water were most effective at improving oil-water compatibility. The emulsion layer was thickest, 14 mm, in the acetate treatment. In addition, emulsion droplet size was smallest in the acetate treatment, indicating greater emulsion stability in the acetate treatment. This is evident in FIG. 1, which shows vials 1-4 containing treatments 1-4, respectively. Treatment 1, containing microorganisms but no added carbon/energy source, had the lowest emulsion height and relatively course emulsion particles. Treatment 3, containing microorganisms and sodium acetate as the main carbon/energy source, had the highest emulsion height at 14 mm and also showed fine emulsion particle formation. Treatment 2, which had yeast extract added as the carbon/energy source showed an emulsion height of 10 mm and relatively coarse emulsion particles. Treatment 4, absent any addition of microorganisms or carbon/energy source, did not develop any emulsion.

TABLE 3

Supplement additions and emulsion behavior

| Treatment # | Supplement Addition | Microbial inoculum | Emulsion height, mm | Emulsion droplet size, mm |
|---|---|---|---|---|
| 1 | None | 5 ml production water | 9 | 1-2 |
| 2 | 25 mg/L yeast extract | 5 ml production water | 10 | 1-2 |
| 3 | 2 g/L Na acetate | 5 ml production water | 14 | <0.5 |
| 4 | None | None | No emulsion | No emulsion |

Example #2

The Effect of Various Supplements on the Production of Surface-active Agents

Two treatments were tested in triplicate, to examine the effect of these treatments on the emulsification of crude oil. Non-sterile oil, 10 mL, from the North Slope was combined with 45 mL of mineral medium #1. As shown in Table 4, sodium acetate was added to a final concentration of 2 g per liter in Test Treatment #2. No acetate was added to Test Treatment #1. In addition, 1 mL of supernatant from treatment number 3 in Example 1 was added to Test Treatment #2. After 10 days, the level of the emulsification was measured in the two sets of treatment vials. The thickness of the emulsified layer was measured 30 minutes after vigorous shaking. As shown in Table 4, the combination of microorganisms from oil+treatment vial 3, example 1 with acetate supplementation developed greater emulsion thickness than the vial without acetate and microorganisms. This example shows that microorganisms causing emulsification of oil surrogates are also effective in emulsification of crude oil. Emulsion droplet size was not measured, because the darkness of the oil prevented accurate measurement.

TABLE 4

Thickness of oil emulsion following microbial growth

| Treatment | Non-sterile oil, mL | Na acetate | Inoculum from example 1, treatment #3, mL | Emulsion thickness, mm | | | Average of Vials 1-3 |
|---|---|---|---|---|---|---|---|
| | | | | Vial 1 | Vial 2 | Vial 3 | |
| #1, control | 10 | None | None | 27.5 | 32.5 | 27.5 | 29.2 |
| #2 | 10 | 2 g/L | 1 | 51 | 22.5 | 52.5 | 42 |

Example #3

Figure 2:
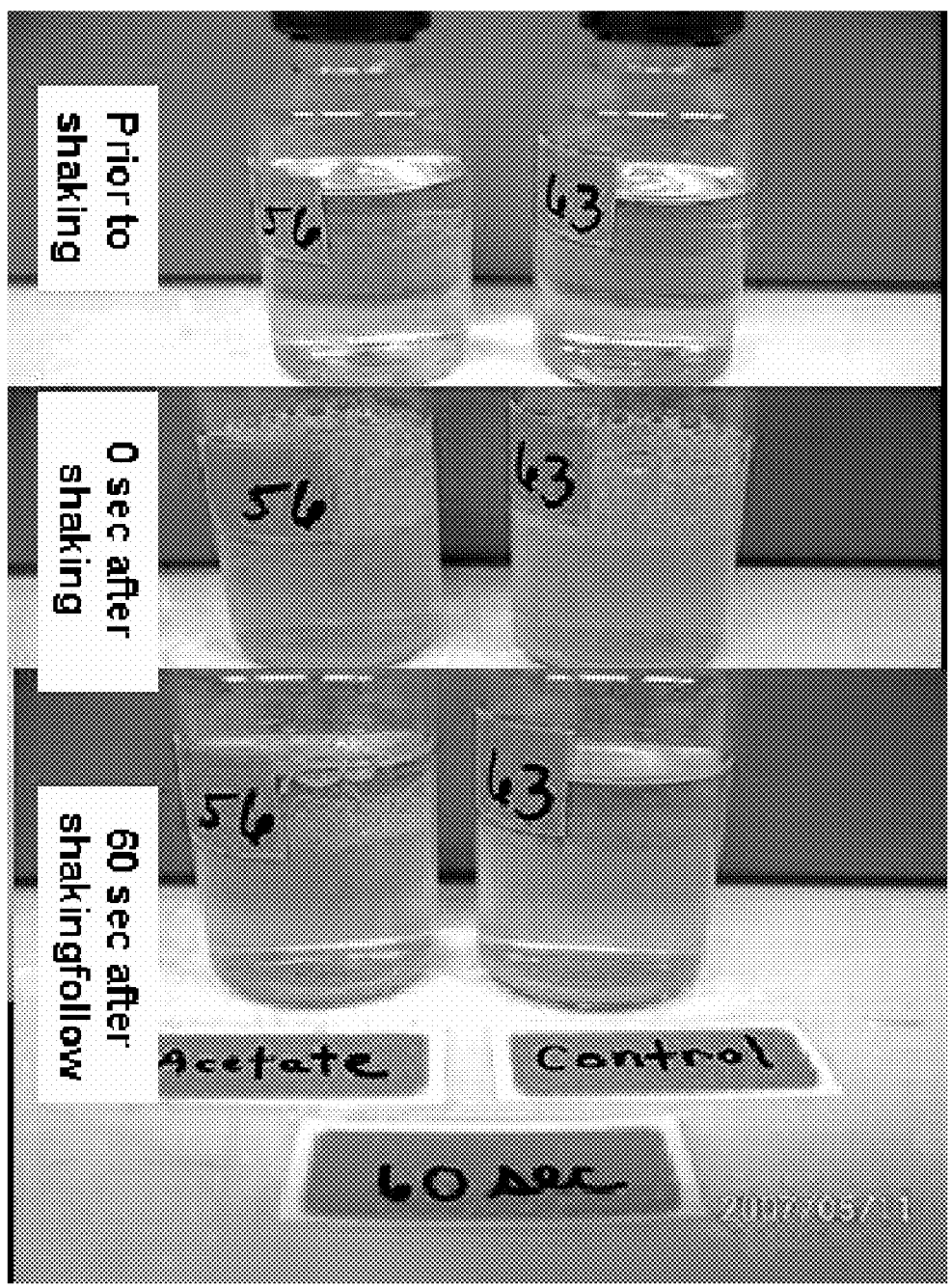
FIG. 2 shows an example of stages in emulsion stability testing. A control and a treatment vial are shown prior to, and subsequent to, shaking.

The Effect of Various Carbon and Energy Sources on the Production of Surface-active Agents A variety of carbon and energy sources were tested for their ability to cause endogenous microorganisms from North Slope injection water to generate surface-active compounds. Different carbon/energy supplements were tested for their ability to induce emulsification. Microbial growth, aided by these supplements, occurred under anaerobic, denitrifying conditions at room temperature. The hydrocarbon, HMN, was used as the oil phase in this experiment. To test the resultant emulsifying capability of the treatments, vials were vigorously shaken for 20 seconds to generate an emulsion layer. The time to disappearance of emulsion layer was then measured. FIG. 2 shows an example of this measurement sequence. In all treatments except controls, which did not receive either carbon/ energy supplement or carbon and energy source with nitrate, the stability of the emulsion improved over time with microbial growth (Table 5). By day 22 sodium propionate, treatment 2, showed the greatest emulsion stability time, 86 seconds, more than 6-fold greater than control treatments 6 and 7. All supplement treatments caused at least a 2-fold increase in emulsion stability time over the controls.

TABLE 4

Emulsion stability time for various supplement treatments made to North Slope injection water

| Treatment # | Supplement treatment | Days of incubation | | | |
|---|---|---|---|---|---|
| | | 0 | 7 | 15 | 22 |
| 1 | soluble starch | 27 | 27.5 | 48.5 | 58 |
| 2 | Na propionate | 12 | 14.5 | 24 | 86 |
| 3 | Na lactate | 11.5 | 15 | 20.5 | 37 |
| 4 | Na acetate | 12 | 15.5 | 29.5 | 60 |
| 5 | Na butyrate | 11.5 | 48 | 21.5 | 37 |
| 6 | No carbon source - control | 10.5 | 14.5 | 16.5 | 12 |
| 7 | No carbon or nitrogen source - control | 15.5 | 12 | 17 | 14 |

The emulsion time stability is indicated in seconds.

Example #4

The Effect of Various Supplements on the Production of Surface-active Agents

A variety of carbon and energy sources were tested for their ability to cause endogenous microorganisms from North Slope production water to generate surface-active compounds. Different carbon energy supplements were tested for their ability to induce emulsification. Microbial growth, aided by these supplements, occurred under anaerobic, denitrifying conditions at room temperature. The hydrocarbon 2,2,4,4,6,8,8-heptamethylnonane was used as the oil phase in this experiment. To test the resultant emulsifying capability of the treatments, vials were vigorously shaken for 30 seconds to generate an emulsion layer. The time to disappearance of emulsion layer was then measured. In all treatments except controls, which did not receive either carbon/energy supplement or carbon and energy source with nitrate, the stability of the emulsion improved over time with microbial growth (Table 6). By day 22, sodium propionate, Treatment #2, showed the greatest emulsion stability time, 198 seconds, more than 3-fold greater than control treatments 6 and 7. All supplement treatments caused an increase in emulsion stability time relative to the controls.

TABLE 5

Emulsion stability time for various supplement treatments made to North Slope production water

| Treatment # | Supplement treatment | Days of incubation | | | |
|---|---|---|---|---|---|
| | | 0 | 8 | 16 | 22 |
| 1 | soluble starch | ND | 71.5 | 86 | 184 |
| 2 | Na propionate | 45 | 62.5 | 89 | 198 |
| 3 | Na lactate | 45 | 76 | 90 | 98 |
| 4 | Na acetate | 45 | 63.5 | 74.5 | 81 |
| 5 | Na butyrate | 45 | 55.5 | 59.5 | 68.5 |
| 6 | No carbon source - control | 45 | 44 | 57 | 54.5 |
| 7 | No carbon or nitrogen source - control | 45 | 45 | 52.5 | 47.5 |

The emulsion time stability is indicated in seconds.
ND; no data

Example #5

Application of the Exogenous Surface-active Agent Water Conditioning Technology to Accelerated Bioremediation The techniques demonstrated in the examples above can be used in field situations to improve the rates of contaminant degradation in situations using remediation of hydrocarbon contaminated subsurface sites in situations where water injection is in use.

An injector well is typically used to force water into the contaminated subsurface formation. This allows agents that aid in contaminant removal to be added to the groundwater in the formation. To prevent movement of contamination off site, interceptor wells also withdraw water from the contaminated formation. The combination of injector and interceptor wells controls ground water flow in the contaminated subsurface formation.

A 9000-gallon (34,000 liters) tanker truck is brought to the site of contamination to serve as a convenient holding tank. Connections are made to the injector and interceptor well pipelines. A 20 horsepower recirculating water pump is also connected to the tank in order to allow mixing of the tank. 30,000 liters of interceptor water are added to the tank. Sodium propionate, 4400 pounds (1996 kg), is added and dissolved into the tank water. Sodium nitrate, 900 pounds (408 kg), is added and dissolved into the tank water. The tank is filled to capacity with interceptor water. The tank is mixed intermittently, preferably totaling at least 6 hours each day. Production of surface-active agents is monitored daily by measuring emulsion stability time as described in the detailed description of the invention.

When emulsion stability time is at a maximum, the contents of the tank are metered into the injection water pipeline in a manner that prevents loss of injectivity in the injector well. The surface-active agents produced by the exogenous microorganisms are thus distributed into the contaminated site. The addition of the surface-active agents is expected to result in accelerated contaminant removal.

From the foregoing description, one skilled in the art can easily ascertain the essential characteristics of this invention and, without departing from the spirit and scope thereof, can make various changes and modifications to the invention to adapt it to various usages and conditions.

What is claimed is:

1. A method for improving hydrocarbon-water compatibility in a subsurface hydrocarbon-contaminated site comprising the steps of:
    (a) obtaining a sample of hydrocarbon-exposed surface water comprising surface-active agents and further comprising mixed populations of microorganisms capable of producing surface-active agents;
    (b) optionally supplementing the surface water of (a) with at least one member selected from the group consisting of (1) at least one carbon/energy source, (2) at least one nitrogen source, and (3) a combination of (1) and (2), such that the final molar ratio of carbon to nitrogen in the surface water of (a) is at least about 6 to 1, thereby producing a supplemented surface water;
    (c) incubating the hydrocarbon-exposed surface water of (a) or the supplemented surface water of (b) under aerobic or anoxic conditions to produce conditioned water having a desired level of surface-active agents; and
    (d) injecting the conditioned water of (c) into said subsurface hydrocarbon-contaminated site such that the conditioned water comes in contact with hydrocarbons present at the site, thereby improving said hydrocarbon-water compatibility.

2. The method of claim 1, wherein the final carbon to nitrogen ratio is at least about 12 to 1.

3. The method of claim 2, wherein the final carbon to nitrogen ratio is at least about 25 to 1.

4. The method of claim 1, wherein said incubating is carried out under anoxic conditions.

5. The method of claim 1 or claim 2, wherein the carbon/energy source is selected from the group consisting of soluble starch, potato starch, vegetable starch, propionate, acetate, vinegar neutralized to about pH 7, lactate, whey solids, lactic acid neutralized to about pH 7, butyrate, butyric acid neutralized to about pH 7, glucose, high fructose corn syrup, soybean oil, corn oil and olive oil.

6. The method of claim 5, wherein the vegetable starch is cornstarch.

7. The method of claim 5, wherein propionate, acetate, lactate or butyrate are added as soluble salts.

8. The method of claim 1 or claim 4, wherein the nitrogen source is (1) at least one soluble nitrate salt, (2) at least one soluble nitrite salt or (3) a combination of at least one soluble nitrate salt and at least one soluble nitrite salt.

9. The method of claim 8, wherein said soluble nitrate or nitrite salt is a sodium, potassium, calcium or magnesium salt.

10. The method of claim 8, wherein the nitrogen source is nitrate.

11. The method of claim 1, wherein the desired level of surface-active agents is determined using a determination of emulsion stability time.

12. The method of claim 1, wherein the desired level of surface-active agents is determined by measuring surface tension.

13. The method of claim 1, wherein the desired level of surface-active agents is the maximal level produced.

14. The method of claim 1, wherein the hydrocarbon-containing site comprises oil.

15. The method of claim 1, wherein the hydrocarbon-containing site comprises gasoline.

16. The method of claim 1, claim 14 or claim 15, wherein improving said hydrocarbon-water compatibility results in improved remediation of the subsurface hydrocarbon-contaminated site.

* * * * *